United States Patent [19]
Kressin

[11] 3,760,057
[45] Sept. 18, 1973

[54] SEPARATION OF MERCURY FROM AQUEOUS SOLUTION
[75] Inventor: Ivan K. Kressin, Los Almos, N. Mex.
[73] Assignee: The United States of America as represented by the United States Atomic Energy Commission, Washington, D.C.
[22] Filed: Aug. 2, 1971
[21] Appl. No.: 168,339

[52] U.S. Cl. ............ 423/463, 423/109, 23/312 R
[51] Int. Cl. ..... C01g 13/04, C01g 13/00, C01d 3/12
[58] Field of Search .................... 23/87 R, 312 R; 423/109, 463; 75/101 BE, 121

[56] References Cited
OTHER PUBLICATIONS
Paul Pascal's "Noureau Traite de Chimie Minerale," Tome V, 1962, pages 707–709, Masson Et Cie, Editeurs, Paris, France.
J. R. Partington's "A Text-Book of Inorganic Chemistry," 1950 Ed., Sixth Edition, page 793, MacMillan & Co., Ltd., London.
J. W. Mellor's "A Comp. Treatise on Inorg. and Theo. Chem.," Vol. 4, 1923, page 912, Longmans, Green & Co., New York.
Book "Solvent Extraction in Analytical Chemistry" by G. H. Morrison and H. Frieser, 1957 Ed., pages 133, 134, 218 and 239, John Wiley & Sons, Inc., New York.

Primary Examiner—Edward Stern
Attorney—Roland A. Anderson

[57] ABSTRACT

A solvent extraction process in which mercury, converted to the triiodide, is rapidly extracted from sulfuric acid solution into octyl alcohol. The extraction is quantitative from 2M or higher acid concentrations and about 98 percent from 1M acid concentrations. The n-octanol is readily made available for reuse by back extracting the mercury from the alcohol as the tetraiodide.

4 Claims, No Drawings

SEPARATION OF MERCURY FROM AQUEOUS SOLUTION

BACKGROUND OF THE INVENTION

The invention described herein was made in the course of, or under, a contract with the U. S. Atomic Energy Commission. It relates to a method of separating mercury from aqueous solution and more particularly to a process for the extraction of mercury from aqueous solution which comprises converting the mercury to mercuric triiodide in the presence of sulfuric acid and then bringing the acid solution into intimate contact with a solvent substantially immiscible with water and in which the mercuric triiodide has a high solubility.

The unusually great affinity of mercury for iodide ion and the formation constants of the iodide complexes of mercuric ion are well known in the art. It is also well known that Hg(II) complexes are extracted from aqueous solution by organic solvents. Generally, the iodide is provided in the form of HI; however, it is known that the free acid can be replaced by $H_2SO_4$ to which appropriate amounts of KI have been added. According to Morrison and Frieser, Solvent Extraction in Analytical Chemistry, p. 133 (1957), the concentration of iodide and of the acid can be varied over quite wide limits without reducing the efficiency of extraction.

Heretofore, solvent extraction techniques for removing mercury from aqueous solution by means of iodide complexes have almost invariably involved formation of the tetraiodide complex. A problem that may arise with this complex, however, is achieving quantitative extraction of the mercury from the aqueous solution. Thus, although Hg(II) is reported to be 100 percent extracted from a 6.9M HI solution into ethyl ether, when 1.5M KI in 1.5N $H_2SO_4$ is used, mercury is only 33 percent extracted into ethyl ether.

SUMMARY OF THE INVENTION

When the iodide concentration is maintained at a level appropriate for the formation of the triiodide complex, mercury triiodide is rapidly and quantitatively extracted into n-octanol from 2M or higher concentrations of sulfuric acid. By avoiding a large excess of iodide during the extraction, the formation of mercuric diiodide and mercuric tetraiodide is avoided. Neither of these complexes will quantitatively extract into n-octanol. Approximately 98 percent of the mercury is extracted into n-octanol from 1M sulfuric acid solution, with one extraction, when the mercury is present as the triiodide complex.

DESCRIPTION OF THE PREFERRED EMBODIMENT

Mercuric oxide was dissolved in 0.1M sulfuric acid solution. An aliquot of this solution containing 200 micrograms of mercury was transferred to a separating funnel and an equal volume of 9M sulfuric acid added. The mixture was stirred and 0.5 ml of 0.1M potassium iodide solution and 10 ml of n-octanol were added. The mercury was extracted into the n-octanol for one minute and the two phases were then separated. The alcohol was washed with water to remove excess sulfuric acid and the mercury back extracted from it with 3M potassium iodide solution.

Under these conditions, the mercury is extracted as the triiodide and the extraction is quantitative. With all conditions the same except that the sulfuric acid concentration is 2M, the extraction is still quantitative. When the sulfuric acid concentration is 1M the extraction is about 98 percent with one extraction. Under these conditions, varying the iodide content of the sulfuric acid solution ± 50 percent does not affect the efficiency of the extraction. If the iodide content is increased more than about 50 percent, the reaction $$HgI_3^- + I^- \rightleftarrows HgI_4^{-2}$$

is driven to the right and a substantial amount of the tetraiodide complex is formed. This complex is not quantitatively extracted into n-octanol.

As indicated in the art, a number of organic solvents are suitable for extracting mercuric iodide complexes from aqueous acid solution. Among the solvents reported are ethyl ether, methyl isobutyl ketone, and methyl isopropyl ketone. Saturated alcohols that are liquid at room temperature and have four or more carbon atoms extract the iodide complexes as well.

What I claim is:

1. A process for the extraction of mercury from aqueous solution which comprises converting the mercury to mercuric triiodide complex in the presence of sulfuric acid, bringing the acid solution into intimate contact with n-octanol for a time sufficient for mercury present in the acid solution to extract into the n-octanol, and separating the acid solution from the n-octanol.

2. The process of claim 6 wherein said acid solution is about 1 M.

3. The process of claim 1 wherein said acid solution contains a 2 M or higher concentration of sulfuric acid.

4. The process of claim 1 wherein said aqueous solution contains an amount of iodide sufficient to convert mercury dissolved within it to substantially completely mercuric triiodide complex but insufficient to transform the triiodide complex into the tetraiodide complex.

* * * * *